US010785959B2

(12) United States Patent
Shrestha

(10) Patent No.: US 10,785,959 B2
(45) Date of Patent: Sep. 29, 2020

(54) PET REWARD DEVICE WITH MODULAR ACCESSORY STORAGE

(71) Applicant: HIMALAYAN CORPORATION, Mukilteo, WA (US)

(72) Inventor: Suman K. Shrestha, Marysville, WA (US)

(73) Assignee: Himalayan Corporation, Mukilteo, WA (US)

( * ) Notice: Subject to any disclaimer, the term of this patent is extended or adjusted under 35 U.S.C. 154(b) by 372 days.

(21) Appl. No.: 15/458,605

(22) Filed: Mar. 14, 2017

(65) Prior Publication Data
US 2017/0258041 A1 Sep. 14, 2017

Related U.S. Application Data

(60) Provisional application No. 62/369,820, filed on Aug. 2, 2016, provisional application No. 62/308,208, filed on Mar. 14, 2016.

(51) Int. Cl.
*A01K 27/00* (2006.01)
*A01K 15/02* (2006.01)
*A01K 5/01* (2006.01)
*F21V 33/00* (2006.01)

(52) U.S. Cl.
CPC .......... *A01K 27/008* (2013.01); *A01K 5/0114* (2013.01); *A01K 15/02* (2013.01); *F21V 33/0004* (2013.01)

(58) Field of Classification Search
CPC .... A01K 27/008; A01K 5/0114; A01K 1/035; B65D 21/0228; B65D 21/0204; B65D 21/0201
See application file for complete search history.

(56) References Cited

U.S. PATENT DOCUMENTS

| 5,671,856 A * | 9/1997 | Lisch | A01K 97/06 206/519 |
| 6,883,989 B2 * | 4/2005 | Kushner | A63B 47/04 206/226 |
| 7,585,125 B2 * | 9/2009 | Muhlhausen | B65D 23/12 401/123 |
| 8,602,257 B2 * | 12/2013 | Godsell | B60N 3/101 206/225 |

(Continued)

FOREIGN PATENT DOCUMENTS

GB 2525457 A * 10/2015 ........... A47K 5/1201

OTHER PUBLICATIONS

Amazon, "Leanlix Lickable Dog Treats, Large," Product Description with comments dated 2013 and 2014, accessed on May 17, 2017.

*Primary Examiner* — Magdalena Topolski
(74) *Attorney, Agent, or Firm* — Amin, Turocy & Watson, LLP

(57) ABSTRACT

Pet reward devices with modular accessory storage may generally include handheld devices which dispense rewards and also store any of a variety of modular accessories. Example rewards may include licks of a reward formulation, e.g. a reward formulation that may be manually advanced through the pet reward device by the pet owner in order to expose more surface area thereof. Example modular accessories include noisemakers which may be useful for pet training, as well as other useful accessories such as whistles, flashlights, etc.

10 Claims, 5 Drawing Sheets

(56) References Cited

U.S. PATENT DOCUMENTS

| | | | |
|---|---|---|---|
| 9,540,149 B2* | 1/2017 | Worthington | B65D 21/0201 |
| 9,832,970 B1* | 12/2017 | Conde | A01K 5/0114 |
| 9,861,077 B2* | 1/2018 | Aked-Hurditch | A01K 27/005 |
| 9,999,199 B1* | 6/2018 | Dadalto | A01K 15/021 |
| 10,058,074 B1* | 8/2018 | Bussell | A01K 23/005 |
| 2004/0134438 A1* | 7/2004 | Ticktin | A01K 5/0114 |
| | | | 119/65 |
| 2006/0112898 A1* | 6/2006 | Fjelstad | A01K 1/0236 |
| | | | 119/496 |
| 2006/0278169 A1* | 12/2006 | Logan | A01K 5/0114 |
| | | | 119/61.56 |
| 2007/0074670 A1* | 4/2007 | Edwards | A01K 5/0114 |
| | | | 119/65 |
| 2008/0083378 A1* | 4/2008 | Pearce | A01K 5/0114 |
| | | | 119/707 |
| 2009/0080180 A1* | 3/2009 | Bertken | A47G 19/2227 |
| | | | 362/101 |
| 2009/0151645 A1* | 6/2009 | Fangsrud | B65F 1/062 |
| | | | 119/161 |
| 2009/0255474 A1* | 10/2009 | Gleesing | A01K 61/85 |
| | | | 119/51.04 |
| 2009/0314223 A1* | 12/2009 | Yuu | A01K 15/02 |
| | | | 119/720 |
| 2010/0095895 A1* | 4/2010 | Laliberta | A01K 5/0275 |
| | | | 119/56.1 |
| 2010/0251966 A1* | 10/2010 | Benson | A01K 5/0114 |
| | | | 119/51.01 |
| 2011/0226187 A1* | 9/2011 | Bertsch | A01K 5/0114 |
| | | | 119/61.55 |
| 2011/0297093 A1* | 12/2011 | Lai | A01K 5/0114 |
| | | | 119/54 |
| 2012/0085674 A1* | 4/2012 | Kemper | B65D 21/0228 |
| | | | 206/508 |
| 2014/0091086 A1* | 4/2014 | Sorensen | A47G 19/2205 |
| | | | 220/4.27 |
| 2014/0158064 A1* | 6/2014 | Cooligan-Knoefel | A01K 27/004 |
| | | | 119/796 |
| 2014/0238949 A1* | 8/2014 | Patel | B65D 21/0228 |
| | | | 215/6 |
| 2014/0360434 A1* | 12/2014 | Yacov | A01K 7/00 |
| | | | 119/51.5 |
| 2014/0360908 A1* | 12/2014 | Sorensen | B65D 21/0228 |
| | | | 206/501 |
| 2016/0219838 A1* | 8/2016 | Flaig | A01K 27/008 |
| 2016/0368661 A1* | 12/2016 | Moore | B65D 21/0228 |
| 2016/0374312 A1* | 12/2016 | Tharp | A01K 5/0114 |
| | | | 119/51.5 |
| 2017/0006825 A1* | 1/2017 | Knight | A01K 5/0258 |
| 2017/0217635 A1* | 8/2017 | Johnson | B65D 21/08 |
| 2017/0233170 A1* | 8/2017 | Badurina | A01K 27/008 |
| | | | 242/557 |
| 2019/0000040 A1* | 1/2019 | McIlvenna | A01K 15/026 |

* cited by examiner

PET REWARD DEVICE WITH MODULAR ACCESSORY STORAGE

CROSS-REFERENCE TO RELATED APPLICATIONS

This is a nonprovisional application which claims priority under 35 U.S.C. § 119 of U.S. Provisional Patent Application 62/369,820, entitled "PET REWARD DEVICE WITH MODULAR ACCESSORY STORAGE", filed on Aug. 2, 2016, and U.S. Provisional Patent Application 62/308,208, entitled "PET REWARD DEVICE WITH MODULAR ACCESSORY STORAGE", filed on Mar. 14, 2016.

BACKGROUND

Modern pet owners love their pets and spend significant time and resources to feed, exercise, train, and reward their pets. Most dog training involves offering positive rewards; small treats are often given multiple times during training. Dogs are attracted to food rewards as well as reward objects and reward incentives such as smells. There is an ongoing need to provide pet owners with useful pet training equipment.

SUMMARY

A pet reward device with modular accessory storage is disclosed. Some example pet reward devices may include a plurality of interlocking sections, wherein each interlocking section is adapted to releasably interlock with at least one other interlocking section. The plurality of interlocking sections may comprise a proximal end section adapted to house a first pet accessory, a distal end section adapted to house a second pet accessory, and optionally one or more middle sections also adapted to house pet accessories. The first pet accessory may comprise, e.g., an edible reward, and the proximal end section may comprise, e.g., a mechanism to manually advance the edible reward out of the proximal end section. The second pet accessory may comprise, e.g., a flashlight. The middle sections may include, e.g., a first middle section adapted to house a bag dispenser, and a second middle section adapted to house a noisemaker.

Some example pet reward devices may include a housing having a proximal end and a distal end. A reward formulation may be disposed inside the proximal end of the housing. A mechanism inside the housing may be operable to manually advance the reward formulation out of the proximal end of the housing. A removable cap may cover the reward formulation at the proximal end of the housing, and a barrier may be disposed inside the housing between the reward formulation at the proximal end of the housing, and modular accessory storage compartments at the distal end of the housing.

At least one modular accessory storage compartment may be disposed at the distal end of the housing. The modular accessory storage compartment(s) may securely and releasably engage with modular accessories adapted to engage inside the modular accessory storage compartment(s). An example modular accessory may comprise a noisemaker such as a clicker which may be useful to communicate with pets during training. Additional aspects of this disclosure are described in further detail below.

BRIEF DESCRIPTION OF THE DRAWINGS

Various features and attendant advantages of the disclosed technologies will become fully appreciated when considered in conjunction with the accompanying drawings, in which like reference characters designate the same or similar parts throughout the several views, and wherein.

DETAILED DESCRIPTION

Figure 1:
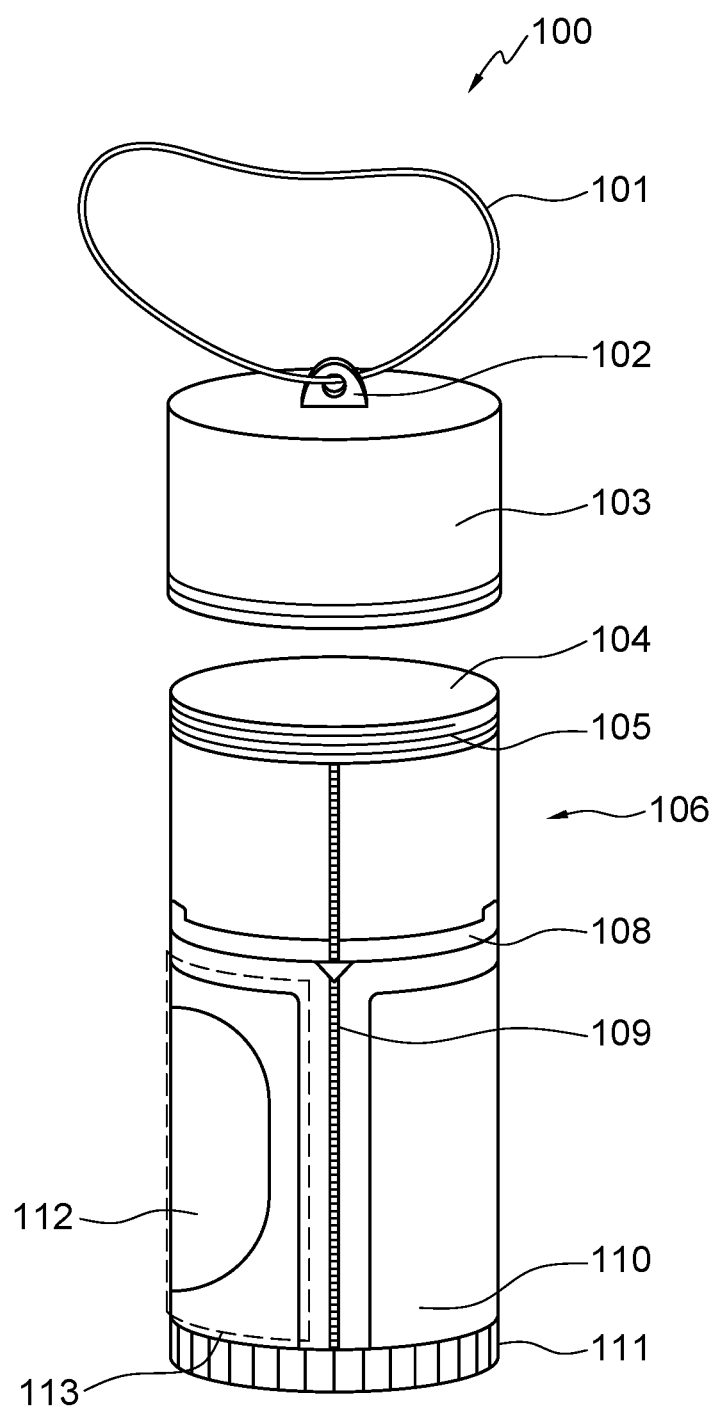
FIG. 1 illustrates an example pet reward device with modular accessory storage.

Prior to explaining embodiments of the invention in detail, it is to be understood that this disclosure is not limited to the details of construction or arrangements of the components and method steps set forth in the following description or illustrated in the drawings. Embodiments of this disclosure are capable of other embodiments and of being practiced and carried out in various ways. Also, it is to be understood that the phraseology and terminology employed herein are for the purpose of the description and should not be regarded as limiting.

Pet reward devices with modular accessory storage may generally include handheld devices which dispense rewards and also store any of a variety of modular accessories. Example rewards may include licks of a reward formulation, e.g. a reward formulation that may be manually advanced through the pet reward device by the pet owner in order to expose more surface area thereof. Example modular accessories include noisemakers which may be useful for pet training, as well as other useful accessories such as whistles, flashlights, etc.

FIG. 1 illustrates a first example pet reward device 100 with modular accessory storage. Pet reward device 100 comprises a housing 106 having a proximal end (e.g. the top of housing 106 in FIG. 1) and a distal end (e.g. the bottom of housing 106 in FIG. 1). A reward formulation 104 is disposed inside the proximal end of the housing 106. In some embodiments, reward formulation 104 may comprise, e.g., approximately 1.5 ounces of a flavored, therapeutic, and/or scented lickable treat substance, e.g. a gel, solid, or paste. In some embodiments, reward formulation 104 may comprise anywhere from 0.75 to 4 ounces of lickable treat. In some embodiments reward formulation 104 may comprise other treat substances such as multiple treat pellets which may be ejected from the housing 106 by the trainer.

In FIG. 1, a barrier 108, a threaded auger 109, and a rotating handle 111 form a mechanism to manually advance the reward formulation 104 out of the proximal end of the housing 106. The barrier 108 is disposed inside the housing 106, between the reward formulation 104 and modular accessory storage compartments at the distal end of the housing 106. A removable cap 103 covers the reward formulation 104 at the proximal end of the housing 106.

At least one modular accessory storage compartment 113 may be disposed at the distal end of the housing 106. The modular accessory storage compartment 113 is indicated by the dashed rectangle in FIG. 1. Pet reward device 100 also includes a second modular accessory storage compartment at the right side of FIG. 1. In some embodiments, only one, or else only two modular accessory storage compartments may be included in pet reward device 100. In other embodiments, pet reward device 100 may include additional modular accessory storage compartments.

In some embodiments, modular accessory storage compartments, such as 113, may be of uniform size and shape so that any of the modular accessory storage compartments in pet reward device 100 may house any modular accessory designed for use with pet reward device 100. Similarly, modular accessories designed for use with pet reward device 100 may be of uniform size and shape so that any modular accessory may fit into any of the modular accessory storage compartments in pet reward device 100. For example, in an embodiment such as illustrated in FIG. 1, modular accessory storage compartments and modular accessories may be generally half-cylindrical in shape, with dimensions as described herein. In other embodiments, other modular accessory storage compartment sizes and shapes may be used as will be appreciated.

In some embodiments, modular accessory storage compartments, such as 113, may be sized and shaped to securely and releasably engage modular accessories 110 and 112. For example, modular accessory storage compartment 113 may be sized and shaped to form a sufficiently tight friction fit with modular accessories 110 and 112, so that modular accessories 110 and 112 may not fall out of modular accessory storage compartment 113, but modular accessories 110 and 112 may nonetheless be pulled out of modular accessory storage compartment 113. In some embodiments, modular accessory storage compartment 113 may include a snap-shut door, clip, magnet, or other structure to securely and releasably engage modular accessories 110 and 112.

Modular accessories 110 and 112 may be adapted to securely and releasably engage inside the at least one modular accessory storage compartment 113. For example, modular accessories 110 and 112 may be sized and shaped to slide into the at least one modular accessory storage compartment 113, and to form a sufficiently tight friction fit with modular accessory storage compartment 113, so that modular accessories 110 and 112 may not fall out of modular accessory storage compartment 113, but modular accessories 110 and 112 may nonetheless be pulled out of modular accessory storage compartment 113. In some embodiments, modular accessories 110 and 112 may include clips, magnets, or other structures to securely and releasably engage modular accessory storage compartment 113. Modular accessory 112 may include a noisemaker such as a clicker, and modular accessory 110 may include any number of other accessories disclosed herein, for example, accessory 110 may include one or more of a bag dispenser, a whistle, or a flash light.

In FIG. 1, the removable cap 103 couples securely with the proximal end of the housing 106 to allow hanging the pet reward device 100 from the removable cap 103. In some embodiments, cap 103 and housing 106 may be threaded, e.g., by threading 105, in order to screw cap 103 onto housing 106. Other approaches may include a "pop on" top without threading, which allows the owner/trainer fast access to the reward formulation with just a pop of the cap 103. Further approaches may include a sufficiently strong friction fit between cap 103 and housing 106, or clips, magnets, or latches. The removable cap 103 may comprise a loop 102, and a lanyard 101 or other clip may be threaded through the loop 102. The lanyard 101 can optionally be worn like a pendant around the owner/trainers neck, so the pet reward device 100 remains easy to administer and the modular accessories 110, 112 remain easy to access. Alternatively, a clip may be used to clip to a pocket or belt loop. In some embodiments, a leash may be connectable to loop 102, or the pet reward devices described herein may comprise another structure adapted to secure a leash thereto.

One example mechanism to manually advance the reward formulation 104 out of the proximal end of the housing 106 comprises threaded auger 109 which extends through barrier 108, and rotating handle 111 affixed to the threaded auger 109, wherein the rotating handle 111 is operable to turn the threaded auger 109 to advance barrier 108 toward the proximal end of the housing 106. Barrier 108 may comprise an optionally threaded hole in the center thereof to allow barrier 108 to move up and down the threaded auger 109. Threaded auger 109 may extend substantially the entire length of the housing 106. In some embodiments a "stopper" may be positioned along threaded auger 109, e.g. a plastic triangular piece as illustrated in FIG. 1. The stopper may standardize barrier 108 placement. In the illustrated embodiment, the stopper is placed about 1¾ inches from the top of the housing 106.

A variety of other mechanisms to advance the reward formulation 104 are possible, such as direct push structures to push the barrier 108 and reward formulation 104, pumps to (for example) inflate a balloon under barrier 108, electrical motors coupled with batteries and activated by buttons or switches, sliders disposed along the outside of the housing 106, levers, wedges, or other structures as will be appreciated.

The barrier 108 may comprise a piston sized to fit snugly inside the housing 106. The barrier 108 may slide back and forth inside housing 106 to advance and retract the reward formulation 104. The barrier 108 may generally conform to the shape of the housing 106, e.g., when the housing 106 is cylindrical, barrier 108 may be circular, or when the housing 106 is rectangular, barrier 108 may be square—it will be appreciated that barrier 108 may be shaped to conform to any housing shape. The barrier 108 may comprise side walls, such as the small raised sections at the edges of barrier 108 in FIG. 1. The sidewalls may generally extend from a perimeter of the barrier 108, toward the proximal end of the housing 106. The sidewalls surround a portion of the reward formulation 104 and the sidewalls may be disposed between the reward formulation 104 and the housing 106.

The pet reward device 100 may be sized and shaped to be carried by hand and easily placed in pockets, bags or purses. For example, the housing 106 and removable cap 103 may be cylindrical as illustrated in FIG. 1. The reward formulation 104 may also be cylindrical and may be sized to fit snugly inside the housing 106 as shown. The barrier 108 may comprise a circular piston sized to fit snugly inside the housing 106, and the rotating handle 111 may be circular/cylindrical and inline with the housing 106.

Example dimensions of pet reward device 100 are an overall height of about 4¾ inches, and an overall width of about 1½ inches. Of course the dimensions may vary, and dimensions within a range of about 30% more or less than the illustrated dimensions may be appropriate for some embodiments. The height of cap 103 may be about 1¼ inches, and the height of housing 106 may be about 3½ inches. The circumference of housing 106 may be about 5 inches.

Example methods of using pet reward device 100 include training a dog using the clicks from noisemaker accessory 112 as well as operating rotating handle 111 or other mechanism to reward the dog. Pet reward device 100 can advantageously be aimed/oriented in a downward orientation, with the reward formulation 104 facing the pet's nose. The pet may be looking at reward formulation 104 while waiting to receive its reward. The pet reward device 100 may be a part of a system of training that can include a training manual. Other traditional training accoutrements such as leashes, training collars and cones may be used along with pet reward device 100 to implement a variety of training techniques.

FIGS. 2-5 illustrate another example pet reward device 200 with modular accessory storage. Elements of the pet reward device 200 illustrated in FIG. 2 may be similar to elements of pet reward device 100 illustrated in FIG. 1, as will be appreciated, and furthermore, any features of the pet reward device 100 illustrated in FIG. 1 may be incorporated into those of the pet reward device 200, and vice versa.

Figure 2:
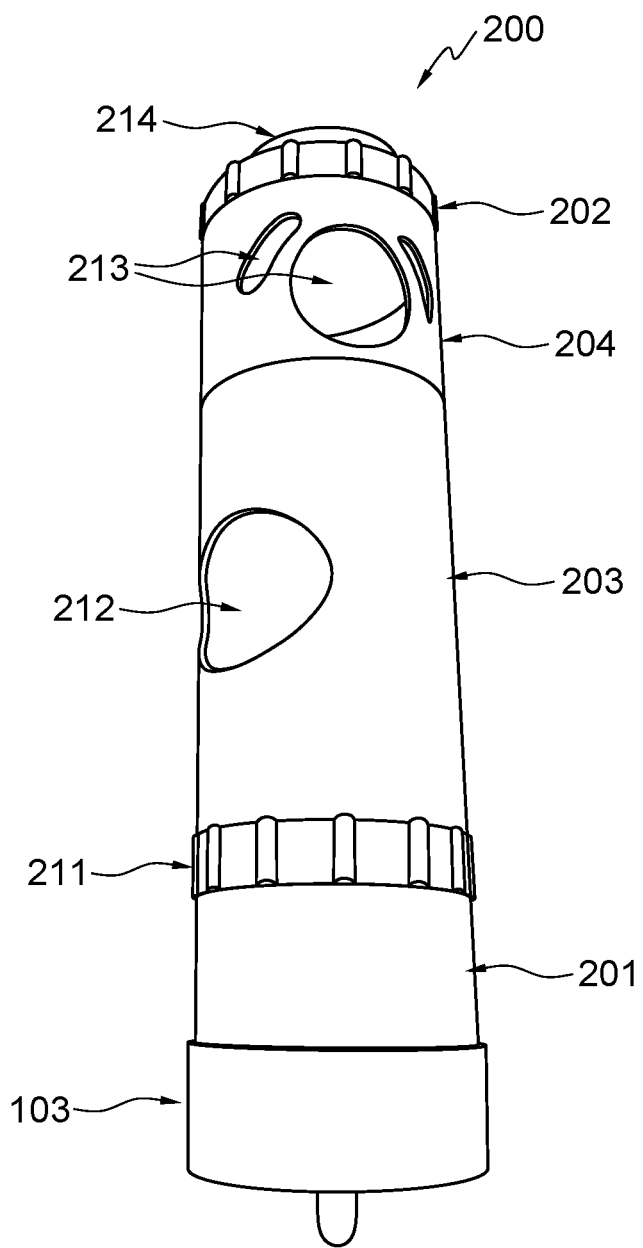
FIG. 2 provides an assembled view of another example pet reward device with modular accessory storage.

FIG. 2 provides an assembled view of example pet reward device 200 with modular accessory storage, in accordance with at least some embodiments of the present disclosure. Pet reward device 200 includes a plurality of interlocking sections 201, 202, 203, and 204, wherein each interlocking section is adapted to releasably interlock with at least one other interlocking section. The plurality of interlocking sections comprises a proximal end section 201 adapted to house a first pet accessory, and a distal end section 202 adapted to house a second pet accessory. The plurality of interlocking sections furthermore comprises at least one middle section, e.g., first middle section 203 and second middle section 204, wherein each of the middle sections are also adapted to house a pet accessory.

Figure 3:
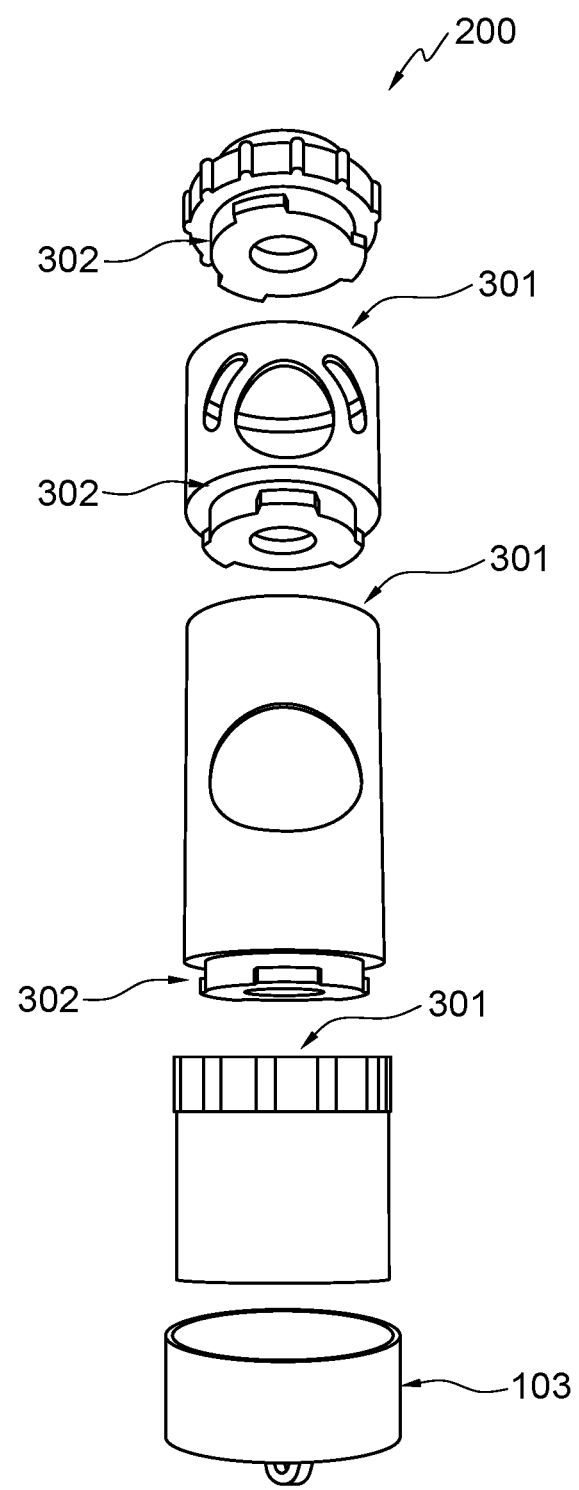
FIG. 3 illustrates an exploded view of the example pet reward device introduced in FIG. 2.

FIG. 3 illustrates an exploded view of the example pet reward device introduced in FIG. 2, in accordance with at least some embodiments of the present disclosure. In some embodiments, the plurality of interlocking sections 201, 202, 203, and 204 may be cylindrical, as illustrated in FIGS. 2-5, and each interlocking section 201, 202, 203, and 204 may comprise a releasable interlock interface at one or more cylinder ends. Releasable interlock interfaces of the plurality of interlocking sections 201, 202, 203, and 204 may comprise male or female turn interlock interfaces which lock and release by turning interlocking sections in opposite directions. For example, referring to FIG. 3, proximal end section 201 may comprise a female releasable interlock interface 301. Middle interlocking sections 203 and 204 may each comprise a female releasable interlock interface 301 as well as a male releasable interlock interface 302, wherein the female and male interfaces 301 and 302 are at opposite ends of the middle sections 203 and 204. Distal end section 202 may comprise a male releasable interlock interface 302. It will be appreciated that while middle sections 203 and 204 may each include two interfaces, including one of each type (male and female), end sections 201 and 202 may each include one interface of either type (male or female), with opposite end sections 201 and 202 having interfaces of opposite types.

In some embodiments, the plurality of interlocking sections 201, 202, 203, and 204 may each be about 0.75-2.5 inches in diameter. The plurality of interlocking sections 201, 202, 203, and 204 may have lengths appropriate for the pet accessories housed therein. For example, proximal end section 201 may have a length of about 1-2 inches. Distal end section 202 may have a length of about 0.5-1.5 inches. First middle section 203 may have a length of about 2-4 inches. Second middle section 204 may have a length of about 0.75-2.0 inches. The combined length of the plurality of interlocking sections may vary depending on how many interlocking sections are employed, and the lengths of the individual interlocking sections. The combined length may be shorter when the plurality of interlocking sections comprises only the end sections 201 and 202, and the combined length may be longer when additional interlocking sections, such as middle sections 203 and 204 are included. In some embodiments, the combined length all of the plurality of interlocking sections 201, 202, 203, and 204 may be about 4-10 inches long.

In some embodiments, each of interlocking sections 201, 202, 203, and 204 may be adapted to house a pet accessory. Example pet accessories are described herein with the understanding that interlocking sections may be adapted for use with other pet accessories as well. In some embodiments, different interlocking sections 201, 202, 203, and 204 may each be adapted to house different pet accessories, while in other embodiments, one or more interlocking sections may be redundantly adapted to hold a same or similar pet accessory. For example, in some embodiments, proximal end section 201 and distal end section 202 may both be adapted to house edible reward formulations, e.g., treats of different flavors.

In some embodiments, interlocking sections 201, 202, 203, and 204 may be modular in the sense that interlocking sections 201, 202, 203, and 204 may be mixed and matched as desired by the user for a particular assembly of pet reward device 200. Any of interlocking sections 201, 202, 203, and 204 may be attached to any other interlocking section, and the resulting assembly is uniform in shape, although not necessarily uniform in length. Accessories may be optionally made to fit into particular interlocking sections 201, 202, 203, and 204.

In some embodiments, middle interlocking sections 203 and 204 may be identical, and accessories designed for use with pet reward device 200 may be of uniform shape and size to fit within any of middle interlocking sections 203 and 204. Meanwhile, proximal and distal end sections 201 and 202 may each hold a special purpose accessory, e.g., a flashlight and a reward formulation.

Figure 5:
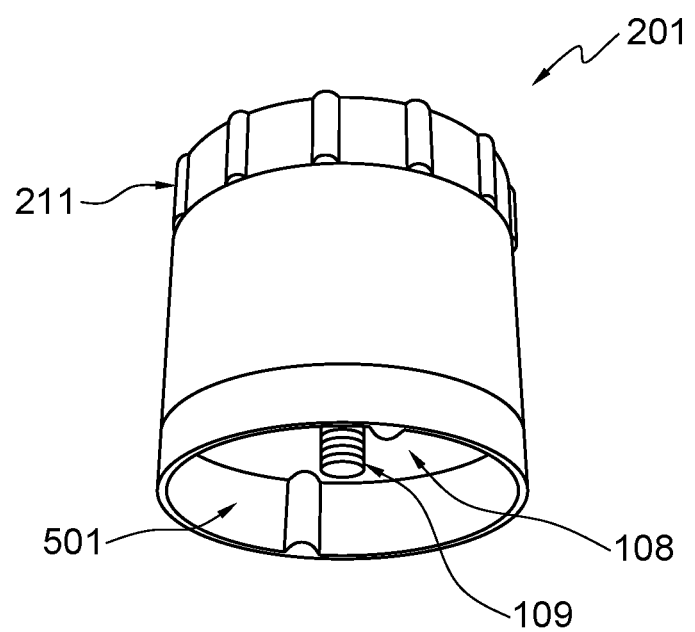
FIG. 5 illustrates an example proximal end section from the example pet reward device introduced in FIG. 2.

FIG. 5 illustrates an example proximal end section 201 from the example pet reward device introduced in FIG. 2, in accordance with at least some embodiments of the present disclosure. In some embodiments, proximal end section 201 may be adapted to house a first pet accessory comprising an edible reward. The edible reward may comprise a reward formulation such as reward formulation 104, described in connection with FIG. 1. The proximal end section 201 may comprise a mechanism to manually advance the reward formulation out of the proximal end 201, such as the mechanism described with reference to FIG. 1. Rotating handle 211 may turn a threaded auger 109 to advance a barrier 108, e.g. as illustrated in FIG. 5. Also similar to FIG. 1, a removable cap 103 may cover the reward formulation. In the embodiment illustrated in FIG. 2, a female releasable interlock interface 301 may be disposed in the rotating handle 211, and when the proximal end section 201 is interlocked with other sections, the reward formulation 104 may be advanced by turning the main body of proximal end section 201 while the rotating handle 211 remains interlocked in a fixed position with respect to the other interlocking sections. A second barrier which, unlike barrier 108, remains in a fixed position and is not advanced by threaded auger 109, may be disposed inside rotating handle 211, e.g., as part of the female releasable interlock interface 301 therein.

In some embodiments, distal end section 202 may be adapted to house a second pet accessory comprising a flashlight 214, such as shown in FIG. 2 and FIG. 3. For example, distal end section 202 may comprise a battery housing, a flashlight bulb, a transparent or semitransparent bulb protection cover (seen in FIG. 2 and FIG. 3), and a flashlight activation/deactivation switch. In some embodiments, the bulb protection cover and activation/deactivation switch may be integrated so that depressing on the bulb protection cover activates and deactivates the flashlight 214. In some embodiments the flashlight 214 may be multi-mode with an off mode, a continuous on mode, a fast pulse mode and a slow pulse mode. In some embodiments the bulb protection cover may be made of sturdy, flexible plastic or rubber which can withstand drops. In some embodiments the bulb protection cover may be dome shaped and may extend from the distal end section 202 as shown in FIG. 2 and FIG. 3.

Figure 4:
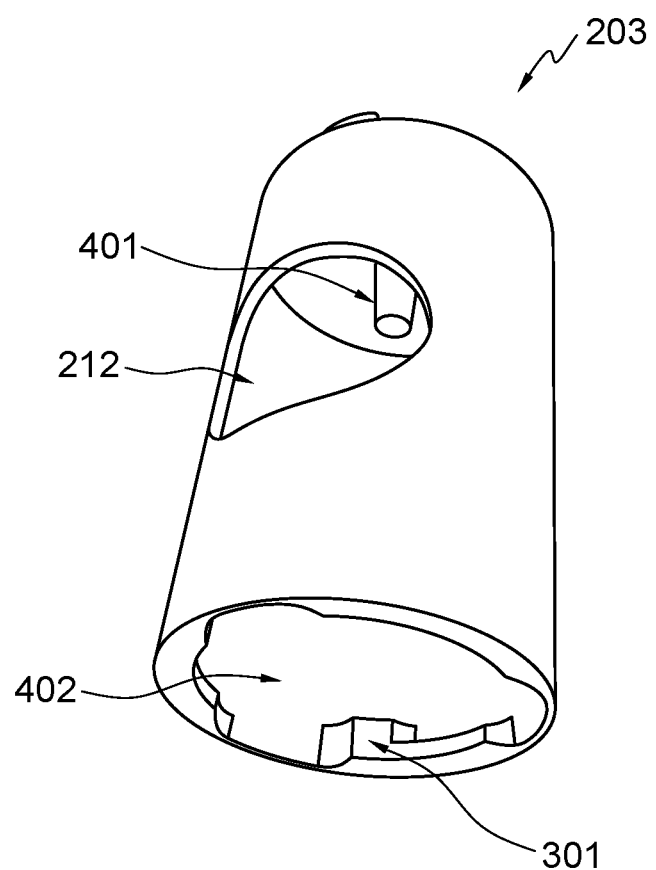
FIG. 4 illustrates an example middle section from the example pet reward device introduced in FIG. 2.

FIG. 4 illustrates an example middle section from the example pet reward device introduced in FIG. 2, in accordance with at least some embodiments of the present disclosure. In some embodiments, middle sections 203 and 204 may each be adapted to house a pet accessory. For example, first middle section 203 may be adapted to house a bag dispenser pet accessory, and second middle section 204 may be adapted to house a noisemaker pet accessory.

FIG. 4 illustrates example aspects of first middle section 203, including a side opening 212 through which individual bags may be pulled, and an end opening 402 at one end of the first middle section 203, through which a roll of bags may be reloaded into the bag dispenser. A pin 401 may stabilize the roll of bags as it rotates inside the first middle section 204.

FIG. 2 illustrates example aspects of second middle section 204, including side openings 213. The second middle section 204 may comprise comprises a side opening for finger access to a noisemaker activation button, e.g., the large middle opening among side openings 213. The smaller side openings among side openings 213 may be used to hold in place stabilization elements extending from a noisemaker pet accessory which is positionable inside the second middle section 204.

While various interlocking sections are described herein, it will be appreciated that embodiments may include additional and/or different interlocking sections adapted to house different pet accessories. Also, any of the interlocking sections may be adapted to house any of the various pet accessories described herein.

While various embodiments have been disclosed herein, other aspects and embodiments will be apparent to those skilled in art.

The invention claimed is:

1. A handheld pet reward device comprising:
a plurality of interlocking sections, wherein each interlocking section is adapted to releasably interlock with at least one other interlocking section;
wherein the plurality of interlocking sections comprises:
a proximal end section comprising a lickable gel reward and a mechanism to advance the lickable gel reward, the mechanism comprising a barrier inside the proximal end section, a threaded auger, and a rotating handle affixed to the threaded auger, wherein the rotating handle is operable to advance the barrier;
at least one middle section comprising a noisemaker accessory; and
a distal end section adapted to house an additional pet accessory;
wherein the lickable gel reward at the proximal end section of the handheld pet reward device can be aimed at the pet and the noisemaker accessory of the handheld pet reward device can be operated for pet training.

2. The pet reward device of claim 1, wherein the lickable gel reward comprises a reward formulation, and wherein the proximal end section comprises a removable cap covering the reward formulation.

3. The pet reward device of claim 1, wherein the additional pet accessory is a flashlight.

4. The pet reward device of claim 1, wherein the plurality of interlocking sections further comprise one or more additional middle sections, wherein the one or more additional middle sections are adapted to house additional pet accessories.

5. The pet reward device of claim 4, wherein an additional middle section of the one or more additional middle sections comprises a bag dispenser pet accessory.

6. The pet reward device of claim 5, wherein the additional middle section of the one or more additional middle sections comprises a side opening through which individual bags are pulled, and an end opening at one end through which a roll of bags may be reloaded into the bag dispenser pet accessory.

7. The pet reward device of claim 1, wherein the middle section comprises a side opening for a noisemaker activation button.

8. The pet reward device of claim 1, wherein the plurality of interlocking sections are cylindrical and wherein each interlocking section comprises a releasable interlock interface at one or more cylinder ends.

9. The pet reward device of claim 8, wherein releasable interlock interfaces of the plurality of interlocking sections comprise male or female turn interlock interfaces which lock and release by turning interlocking sections in opposite directions.

10. The pet reward device of claim 1, wherein the plurality of interlocking sections are 0.75-2.5 inches in diameter, and wherein the combined length of the plurality of interlocking sections is 1.5-8 inches.

\* \* \* \* \*